March 4, 1924.
S. M. BELLRINGER
REAMING TOOL
Filed June 17, 1920
1,485,904
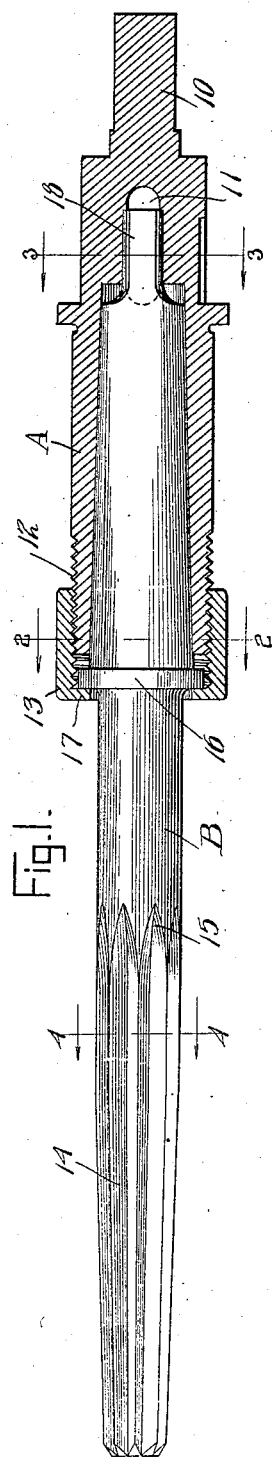
Inventor
Sidney M. Bellringer
By Bradford Morrill & Bierman
Attorney Patented Mar. 4, 1924.                                                    1,485,904

UNITED STATES PATENT OFFICE.

SIDNEY M. BELLRINGER, OF WAYNESBORO, PENNSYLVANIA, ASSIGNOR TO WAYNE TOOL MANUFACTURING COMPANY, OF WAYNESBORO, PENNSYLVANIA, A CORPORATION OF PENNSYLVANIA.

REAMING TOOL.

Application filed June 17, 1920. Serial No. 389,668.

*To all whom it may concern:*

Be it known that I, SIDNEY M. BELLRINGER, a citizen of the United States, residing at Waynesboro, in the county of Franklin and State of Pennsylvania, have invented certain new and useful Improvements in Reaming Tools, of which the following is a specification.

In the use of the tool commonly termed a "bridge reamer" or a reamer for reaming out rivet and bolt holes in bridge, ship, and other iron and steel structural work, a great deal of trouble is experienced because of the drills breaking, or twisting off, either at the point where the drill tang engages the socket in the driving spindle or at the inner ends of the flutes or grooves in the tool. Said flutes or grooves are commonly extended to a point close to the shank of the tool or the part which is inserted in the driving spindle.

Another point of weakness has been at the outer end of the driving spindle which frequently splits or becomes ruptured under the great strain of the work.

The purpose of my invention is to provide a construction of reamer in which these weaknesses will be overcome to a very large extent and a tool provided of much greater durability and strength than those in common use, all as will be hereinafter more fully described and claimed.

Referring to the accompanying drawings, which are made a part hereof, and on which similar reference characters indicate similar parts, Figure 1 is a view showing the tool in elevation and the driving spindle of the pneumatic drill in central section and Figures 2, 3, and 4 cross sections on the dotted lines 2—2, 3—3, and 4—4, respectively, in Figure 1.

In said drawings A represents the driving spindle of the pneumatic drill and B the reamer tool.

In the main the structure shown is not unusual, the improvements consisting in details which will be hereinafter described. The driving spindle has a shank 10 for engagement with the driving chuck of the drill and is formed with a socket to receive the shank of the reamer B, the upper end of the socket being formed with a narrower socket 11 adapted to receive the tang 18 of said shank. The lower end of the spindle is exteriorly screw-threaded, as at 12, and provided with a flanged collar 13 which is interiorly screw-threaded and adapted to be mounted thereon, as shown. Said tang 18 and the socket therefor are of novel form, but this feature forms the subject of my copending application No. 346,287.

The reamer B is of substantially the usual form, except that the flutes 14 extend only to a point as 15 instead of to a point closely adjacent to a collar 16, as is usual, and the upper ends of said flutes taper gradually from the surface of the tool to the bottom of the grooves, thereby avoiding unnecessarily weakening the tool at this point. The shank being left solid from the point 15 to the collar 16, insures the full strength of the metal at this point and the resulting resistance of the strain of the work.

A collar 16 is formed or secured at the base of the shank of the tool B, and the flange 17 of the collar 13 is adapted to engage with its outer face so that when said collar 13 is placed over the tool and screwed to position, it operates to draw said shank tightly into the socket and force the tang 18 into the narrow socket 11 and at the same time serves to re-enforce the lower end of the spindle A so that it is enabled to resist the strain of the work.

Having thus fully described my said invention, what I claim as new and desire to secure by Letters Patent, is:

1. In combination, a reamer having a tapered head having an integral inner collar at the base of the tapered portion and an integral tang at one end, a spindle having a tapered socket, another socket communicating with the said tapered socket for receiving the tang, an annular collar having a threaded connection with the lower end of said spindle and also having a flange to extend under the collar of the reamer to draw such tapered parts into close engagement with each other and to force the tang into its socket, substantially as set forth.

2. A reaming tool having a tapered head terminating at one end in a tang integral with the head, the other end being formed with a collar integral with the head, a spindle having a socket tapered to receive the said tapered head and also having another socket communicating with the tapered socket and adapted to accommodate the tang in driving relation therewith, an annular collar having a threaded connection with the lower end of said spindle and also having a flange to extend under the collar of the reamer to draw such tapered parts into close engagement with each other and to force the tang into its socket, substantially as set forth.

In witness whereof, I have hereunto set my hand and seal at Waynesboro, Pennsylvania this 16th day of June, A. D. nineteen hundred and twenty.

SIDNEY M. BELLRINGER. [L. S.]

Witnesses:
WM. H. STRAUSS,
HELEN M. FERREN.